US011902755B2

(12) United States Patent
Huang et al.

(10) Patent No.: US 11,902,755 B2
(45) Date of Patent: Feb. 13, 2024

(54) LINEAR DIFFERENTIAL DIRECTIONAL MICROPHONE ARRAY

(71) Applicant: Alibaba Group Holding Limited, Grand Cayman (KY)

(72) Inventors: Weilong Huang, Hangzhou (CN); Jinwei Feng, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 85 days.

(21) Appl. No.: 17/761,136

(22) PCT Filed: Nov. 12, 2019

(86) PCT No.: PCT/CN2019/117371

§ 371 (c)(1),
(2) Date: Mar. 16, 2022

(87) PCT Pub. No.: WO2021/092740

PCT Pub. Date: May 20, 2021

(65) Prior Publication Data

US 2022/0408183 A1 Dec. 22, 2022

(51) Int. Cl.
*H04R 3/00* (2006.01)
*H04R 1/40* (2006.01)

(52) U.S. Cl.
CPC ............ *H04R 3/005* (2013.01); *H04R 1/406* (2013.01); *H04R 2201/403* (2013.01)

(58) Field of Classification Search
CPC ............ H04R 1/40; H04R 1/406; H04R 3/00; H04R 3/005; H04R 2201/40;
(Continued)

(56) References Cited

U.S. PATENT DOCUMENTS 6,904,152 B1 * 6/2005 Moorer .................. H04S 5/005 381/61
6,914,854 B1 * 7/2005 Heberley .............. G01S 3/8006 367/119
(Continued)

FOREIGN PATENT DOCUMENTS

CN 101344582 A 1/2009
CN 105223544 A 1/2016
(Continued)

OTHER PUBLICATIONS

International Search Report dated Aug. 10, 2020, from corresponding PCT Application No. PCT/CN2019/117371, 3 pages.
(Continued)

*Primary Examiner* — Thang V Tran
(74) *Attorney, Agent, or Firm* — Lee & Hayes, P.C.

(57) ABSTRACT

Apparatus and method provided herein are directed to a linear differential directional microphone array (LDDMA), which takes into account the directionality of the array elements. The LDDMA may be designed by generating a steering vector for a linear array (LA) having preselected parameters including parameters δ, p, θ, N, and M, generating a constraint matrix based on the steering vector, reformulating the constraint matrix based on a microphone response matrix and a steering matrix, obtaining a beamformer by applying a minimum norm solution in terms of the constraint matrix, verifying a desired characteristic of the LA by calculating the beamformer for a desired direction, and constructing the LA based on the preselected parameters and the beamformer.

20 Claims, 9 Drawing Sheets

(58) Field of Classification Search
CPC ........ H04R 2201/401; H04R 2201/403; H04R 2201/405; H04R 2430/20; H04R 2430/23; H04R 2430/25; H04R 2203/12
See application file for complete search history.

(56) References Cited

U.S. PATENT DOCUMENTS

| | | | | |
|---|---|---|---|---|
| 7,254,199 | B1 * | 8/2007 | Desloge | H04B 7/086 375/350 |
| 8,194,880 | B2 | 6/2012 | Avendano | |
| 9,202,475 | B2 | 12/2015 | Elko et al. | |
| 9,521,484 | B2 * | 12/2016 | Kim | H04R 3/00 |
| 9,591,404 | B1 | 3/2017 | Chhetri | |
| 9,749,745 | B2 * | 8/2017 | Chen | H04R 3/04 |
| 9,812,116 | B2 | 11/2017 | Ushakov | |
| 9,930,448 | B1 * | 3/2018 | Chen | H04R 3/005 |
| 9,980,042 | B1 | 5/2018 | Benattar et al. | |
| 10,356,514 | B2 * | 7/2019 | Elko | H04R 1/406 |
| 11,159,879 | B2 * | 10/2021 | Chen | H04R 3/005 |
| 2012/0093344 | A1 | 4/2012 | Sun et al. | |
| 2014/0270245 | A1 * | 9/2014 | Elko | H04R 3/005 381/92 |

FOREIGN PATENT DOCUMENTS

| | | |
|---|---|---|
| CN | 109633527 A | 4/2019 |
| CN | 110166098 A | 8/2019 |

OTHER PUBLICATIONS

Written Opinion dated Aug. 10, 2020, from corresponding PCT Application No. PCT/CN2019/117371, 4 pages.

Written Opinio dated Aug. 10, 2020, from corresponding PCT Application No. PCT/CN2019/117371, 4 pages.

* cited by examiner 1 kHz, 2ND-ORDER CARDIOID
302

1 kHz, 3RD-ORDER PATTERN
304

3 kHz, 2ND-ORDER CARDIOID
402

3 kHz, 3RD-ORDER PATTERN
404

6 kHz, 2ND-ORDER CARDIOID
502

6 kHz, 3RD-ORDER PATTERN
504

WNG 602

DI 604

LINEAR DIFFERENTIAL DIRECTIONAL MICROPHONE ARRAY

This Application claims priority to and is a national stage of International Application No. PCT/CN2019/117371, filed Nov. 12, 2019, which is incorporated herein by reference.

BACKGROUND

Speech enhancement technology is an indispensable part for many far-field sound capturing devices in adverse environments. Both shotgun microphones (usually a super-cardioid capsule with long, hollow, slotted interference tube) and microphone arrays are capable of attenuating the ambient noise or interference due to their high directionality. Shotgun microphone is commonly used in many applications requiring low noise such as camera-specific, conference-only, or interview-specific situations. Although, this type of shotgun microphones can pick up the sound in a certain direction in a noisy environment, making the picked-up sound clearer and less noisy, they have fixed beamforming properties and are not tunable. Additionally, the cost associated with designing and producing such microphones is relatively high. In comparison, a microphone array with an appropriate signal processing algorithm can provide more flexible solutions.

Differential microphone array (DMA), among all microphone arrays, has been gaining attention recently. As one type of DMA, a linear differential microphone array (LDMA) has been extensively studied, however, many of the LDMA designs published appear to assume the use of the omni-directional microphones. Although a robust LDMA design can improve the white noise gain (WNG) with a minimum-norm solution by using more microphone elements than the order of LDMA, the WNG may still be relatively low, especially at the low frequencies, causing the well-known white noise amplification problem in the practical implementations. Additionally, the directivity factor (DF) of the conventional LDMA usually degrades as the frequency increases and a beampattern also tends to deform at high frequencies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A design method for a linear differential directional microphone array (LDDMA), which takes into account the directionality of the array elements, is provided. Some directional microphone elements have inherent unique property which may be advantageous over the omni-directional elements. The LDDMA may be implemented as a high-performance shotgun sound capturing device.

Omni-directional and directional microphone elements are commonly used in the industry. An omni-directional microphone picks up sound with an equal gain from all directions while a directional microphone picks up sound predominantly from some specific direction(s). Mathematically, the beampattern of a directional microphone can be expressed as $u(p, \theta, \alpha)=p+(1-p)\cos(\theta-\alpha)$, where θ is the sound incident angle, α is the steering direction of the microphone element and p defines the property of the directional microphone, for instance, it makes the well-known cardioid beampattern when p=0.5 and a dipole when p=0. The directional microphones may be any type of directional microphones including omni-directional, cardioid, dipole microphones, and the like.

Two approaches, a dedicated directional microphone using a single microphone cartridge with two sound inlets and a two-omnidirectional-element system with some appropriate digital signal processing, may be utilized to implement a directional microphone. The dedicated directional microphone approach is known to yield a much better directional microphone in term of signal-to-noise ratio (SNR) than the two-omnidirectional-element system approach. This performance advantage of the dedicated directional microphone is mainly due to the signal processing, which creates the directivity, being performed acoustically with the front and rear sound inlets. This unique property of the dedicated directional microphone may be utilized to achieve a better performance than the conventional LDMA. The dedicated directional microphone may come in the form of either Electret Condenser Microphones (ECMs) or Micro-Electro-Mechanical System (MEMS).

Figure 1A:
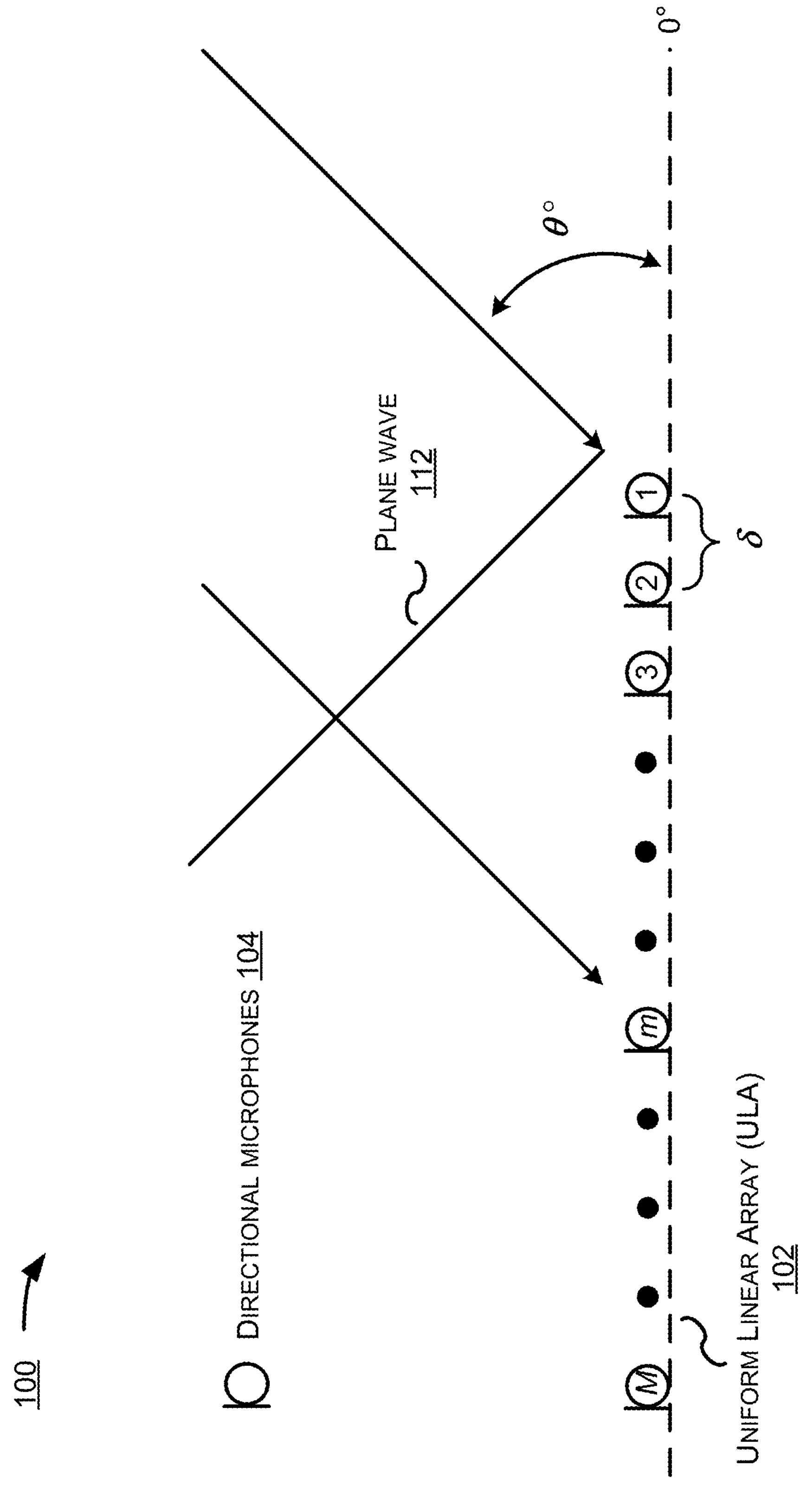
FIG. 1A illustrates an example diagram of a uniform linear array (ULA) of microphones with M directional microphones.
Figure 1B:
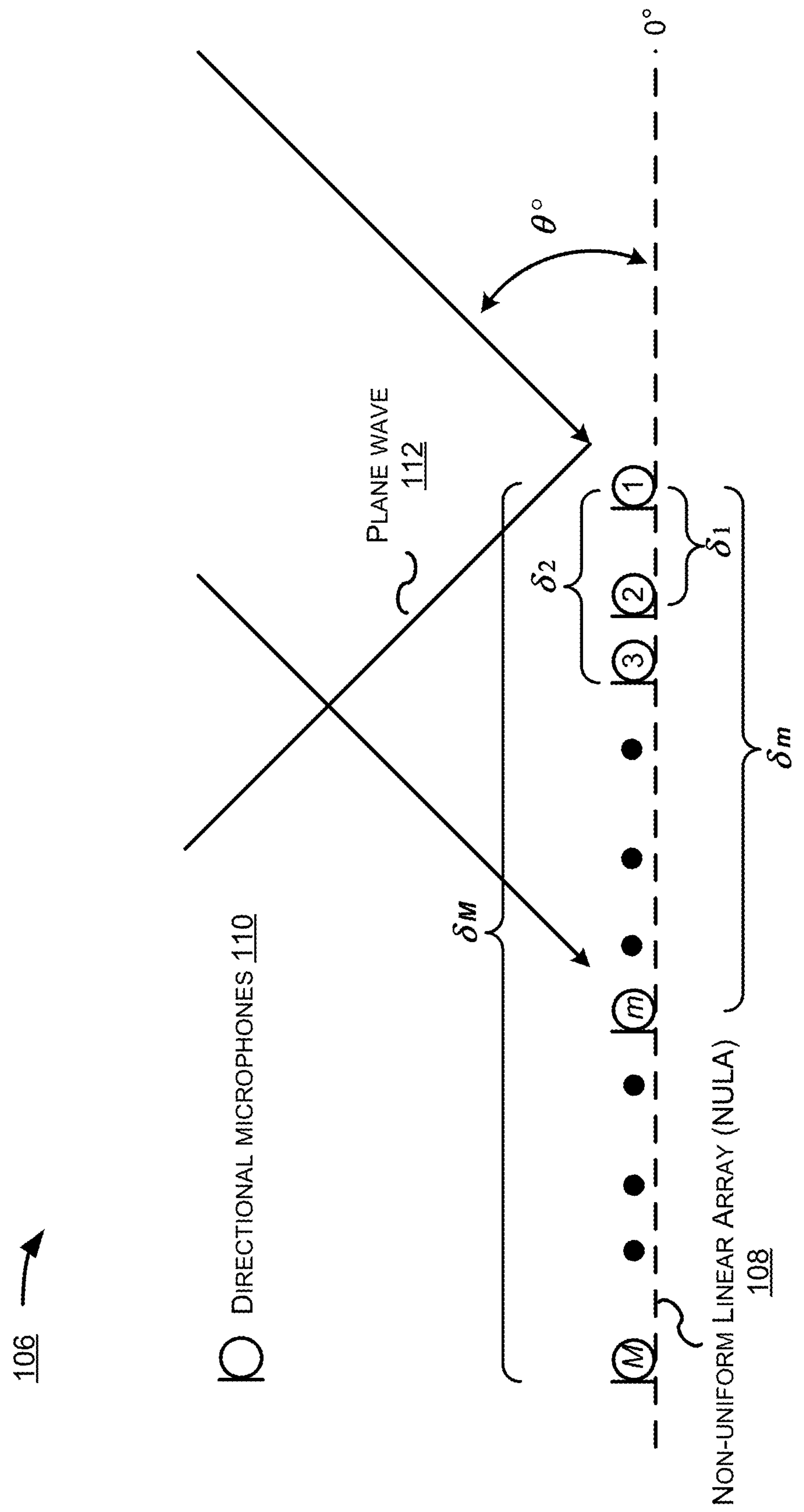
FIG. 1B illustrates an example diagram of a non-uniform linear array (NULA) of microphones with M directional microphones.

FIG. 1A illustrates an example diagram 100 of a uniform linear array (ULA) 102 with M directional microphones 104 and FIG. 1B illustrates an example diagram 106 of a non-uniform linear array (NULA) 108 with M directional microphones 110.

For the ULA 102 in FIG. 1A, the inter-element spacing is denoted as δ and all the directional microphones 104, 1 to M, are pointed rightward, i.e., α=0 (which will be omitted in the following description for simplicity). For the NULA 108 in FIG. 1B, the inter-element spacings vary and are denoted as $\delta_1 \ldots \delta_M$ relative to the first directional microphone 110. All the directional microphones 110, 1 to M, are also pointed rightward. If a plane wave 112 impinges on the array 102 with an incident angle of θ, the steering vector, d, is then given by:

$$d(\omega,\theta)=[p+(1-p)\cos\theta][1\,e^{-j\omega\delta\cos\theta/c}\ \ldots\ e^{-j\omega(M-1)\delta\cos\theta/c}]^T, \quad (1)$$

where the superscript $^T$ is the transpose operator, $j=\sqrt{-1}$ is the imaginary unit, $\omega=2\pi f$ is the angular frequency, and f is the temporal frequency. For comparison, the steering vector for a conventional ULA with omni-directional microphones may be expressed as:

$$a(\omega,\theta)=[1 e^{-j\omega\delta\cos\theta/c} \ldots e^{-j\omega(M-1)\delta\cos\theta/c}]^T, \quad (2)$$

By combining the equation of the beampattern of a directional microphone with the equation for a conventional ULA with omni-directional microphones (2), the steering vector, d (ω, θ), may be expressed as:

$$d(\omega,\theta)=u(p,\theta)a(\omega,\theta) \quad (3)$$

The beamforming problem may be interpreted as a spatial filter to estimate the signal from the desired look direction and suppress the signal from the undesired direction, by applying a complex weight vector:

$$h(\omega)=[H_1(\omega)H_2(\omega) \ldots H_M(\omega)]^T. \quad (4)$$

Given the signal model, in the desired look direction θ=0, the beamformer exhibits a distortionless response, i.e., $d^H(\omega, \theta)h(\omega)=1$, where the superscript $^H$ is the conjugate-transpose operator. In other directions, the beamformer shows a certain distortion on the response, i.e., $d^H(\omega, \theta)h(\omega)<1$.

The mathematical definitions of three widely-used performance measures, i.e., white noise gain (WNG), beampattern, and directivity factor (DF) are provided as follows. WNG shows the ability of a beamformer to suppress spatially uncorrelated noise, and is also the most convenient way to evaluate the sensitivity of a beamformer to some of its imperfections such as sensor noise, position errors, etc. WNG is defined as: $W[h(\omega)]=1/[h^H(\omega)h(\omega)]$. A beampattern illustrates the directional sensitivity of a beamformer to a plane wave 108 impinging on the array 102 from the incident angle θ as illustrated in FIG. 1A and is mathematically defined as $B[h(\omega), \theta]=d^H(\omega, \theta)h(\omega)$. The frequency-invariant beampattern is usually preferred for the broadband speech processing.

Directivity factor (DF) is defined as the ratio between the array output response power in the desired steering direction and the power averaged over all directions, i.e., DF is computed as $DF[h(\omega)]=1/\int_0^{\pi} d\phi \int_0^{2\pi} d\theta \sin\phi|B(\omega, \phi, \theta)|^2$, where $|B(\omega, \phi, \theta)|$ is the is the beampattern in the spherical coordinate system; θ is the azimuth angle and the ϕ is the elevation angle. Directivity index (DI) is defined as $DI[h(\omega)]=10*\log 10(DF[h(\omega)])$.

To design an Nth-order differential beamforming for a ULA with directional microphones, the problem may be formulated as linear system equations shown below.

$$R(\omega,\theta)h(\omega)=c, \quad (5)$$

where θ is a constraint matrix R(ω, θ) of size (N+1)×M is given by:

$$R(\omega, \theta) = \begin{bmatrix} d^H(\omega, 0) \\ d^H(\omega, \theta_1) \\ \cdot \\ \cdot \\ \cdot \\ d^H(\omega, \theta_N) \end{bmatrix}, \quad (6)$$

where $d^H(\omega, \theta_n)$, n=1, 2, . . . , N, is the steering vector of length M defined in the equation (1), and $$\theta=[0\ \theta_1 \ldots \theta_N]^T, \quad (7)$$

$$c=[1\ c_1 \ldots c_N]^T, \quad (8)$$

are vectors of size (N+1) containing the design parameters of the beamformer. θ (bold letter face) indicates a null-position constraint vector as defined in the equation (7) and $\theta_1 \ldots \theta_N$ usually define the desired null directions, and $c_1 \ldots c_N$ are the corresponding response for these directions, i.e., 0 for a null or a small value if some attenuation is desired.

Combining the equations (3) and (6) yields:

$$R(\omega,\theta)=U(p,\theta)A(\omega,\theta), \quad (9)$$

where a steering matrix A(ω, θ) is constructed based on the steering vectors a(ω, θ) as shown below:

$$A(\omega, \theta) = \begin{bmatrix} a^H(\omega, 0) \\ a^H(\omega, \theta_1) \\ \cdot \\ \cdot \\ \cdot \\ a^H(\omega, \theta_N) \end{bmatrix}, \quad (10)$$

and U(p, θ) is called a microphone response matrix and expressed as a diagonal matrix:

$$U(p,\theta)=\mathrm{diag}(1,u(p,\theta_1), \ldots ,u(p,\theta_N)) \quad (11)$$

To maximize the WNG of the array 102 and solve the linear system equations of (5), a minimum-norm solution may be utilized to obtain an LDDMA beamformer as:

$$h(\omega)=R^H(\omega,\theta)R(\omega,\theta)R^H(\omega,\theta)^{-1}c \quad (12)$$

where the LDDMA beamformer with the minimum-norm solution may be recognized as the same form as that of the LDMA.

The difference is reflected in R(ω, θ) which consists of the conventional far-field steering vectors for omnidirectional microphones and the proposed directional microphone response vectors, as shown in the equation (9). Combining the equations (9) and (12), the LDDMA beamformer may be reformulated as:

$$h(\omega)=A^H(\omega,\theta)U^H(p,\theta)[U(p,\theta)A(\omega,\theta)A^H(\omega,\theta)U^H(p,\theta)]^{-1}c. \quad (13)$$

This equation neatly shows the relationship between the solutions of a conventional LDMA and the proposed LDDMA, which extends the LDMA by introducing another degree of freedom, U(p, θ). In other words, the LDMA is a special case of the LDDMA when the microphone response matrix U(p, θ) is reduced to an identity matrix when p=1 for all microphones in the equation (11), i.e., the LDDMA may be used as a more general framework to design an LDMA.

Figure 2:
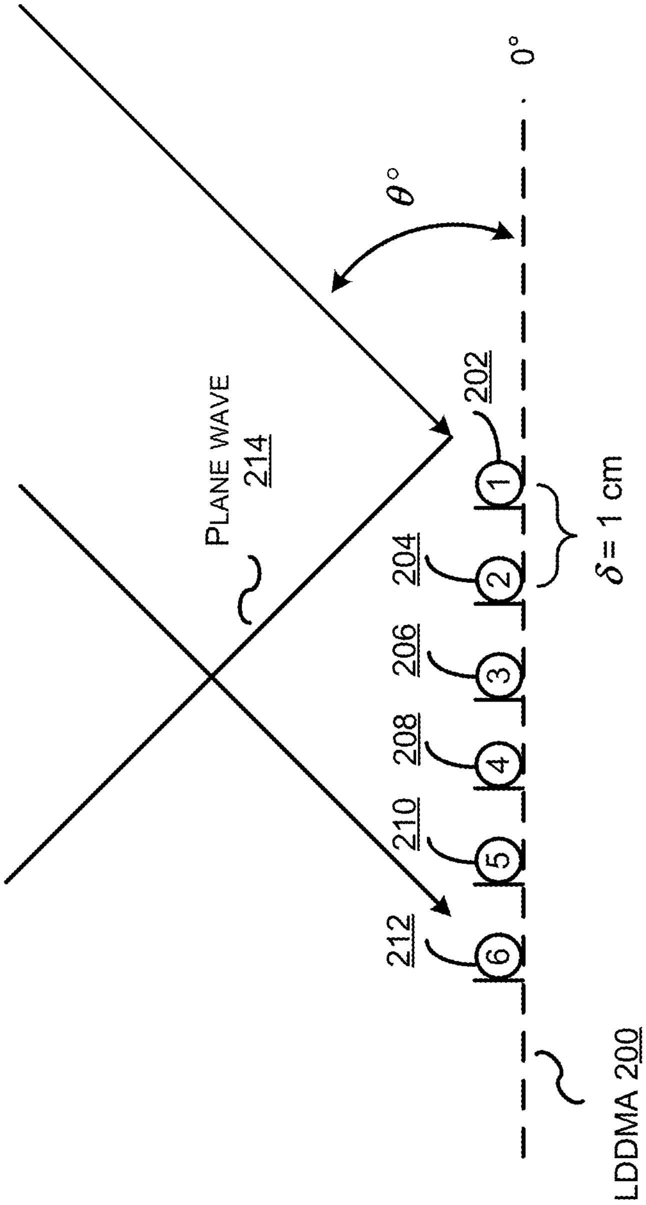
FIG. 2 illustrates an example linear differential directional microphone array (LDDMA).

FIG. 2 illustrates an example LDDMA 200. In this example, the LDDMA 200 is shown to have six microphones, 202, 204, 206, 208, 210, and 212 (M=6), linearly disposed with the inter-element spacing of 1 cm (δ=1 cm). The types of microphones that may be used are omni-directional (p=1), cardioid (p=0.5), and dipole (p=0). The plane wave 214 is shown to be have an incident angle of θ.

To evaluate the effects of different types of directional microphones, i.e., p, on the performance of an LDDMA beamformer, three types of commonly used microphone elements, omnidirectional (p=1), cardioid (p=0.5), and dipole (p=0), are used to form a ULA with the array configuration of δ=1 cm and M=6. The comparison of their beampatterns at frequencies of 1 kHz, 3 kHz and 6 kHz for two designs, i.e., a second-order cardioid with $$\theta = \left[0 \ \ \frac{\pi}{2} \ \ \pi\right]^T$$

and c=$[1\ 0\ 0]^T$ and a third-order pattern with $$\theta = \left[0 \ \ \frac{\pi}{2} \ \ \frac{2\pi}{3} \ \ \pi\right]^T$$

and c=$[1\ 0\ 0\ 0]^T$ are illustrated.

Figure 3A:
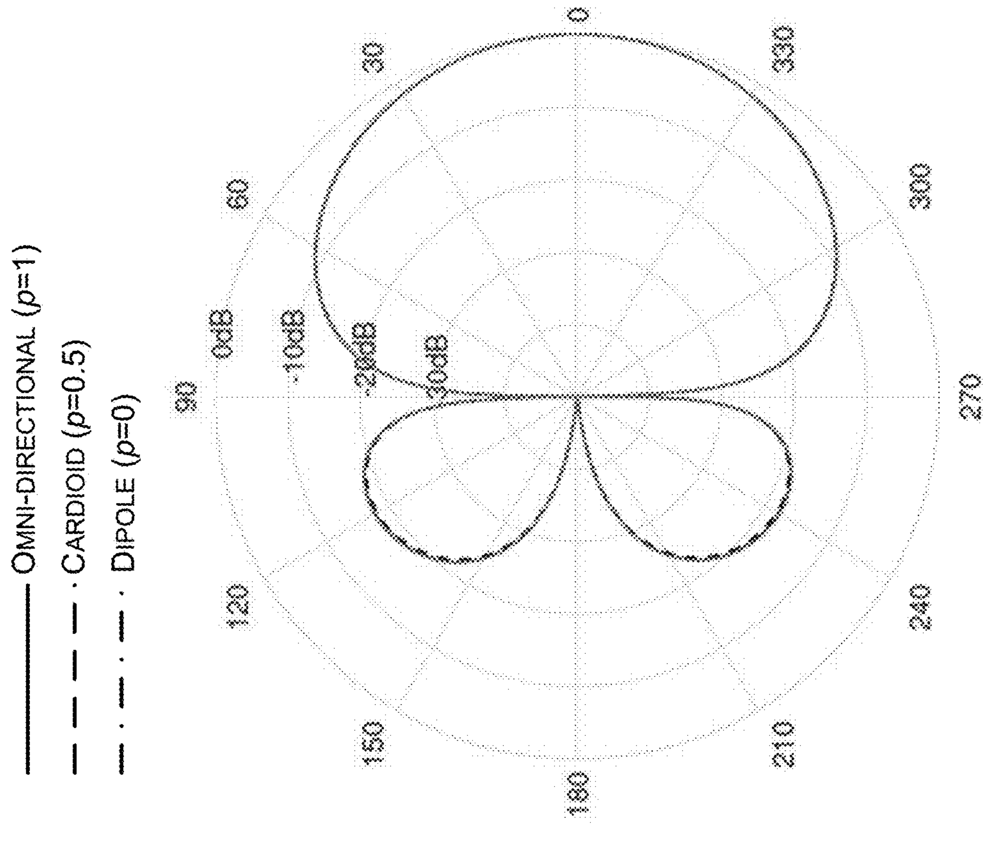
FIGS. 3A and 3B illustrate beampatterns for the second order cardioid and the third order pattern, respectively, at 1 kHz.
Figure 3B:
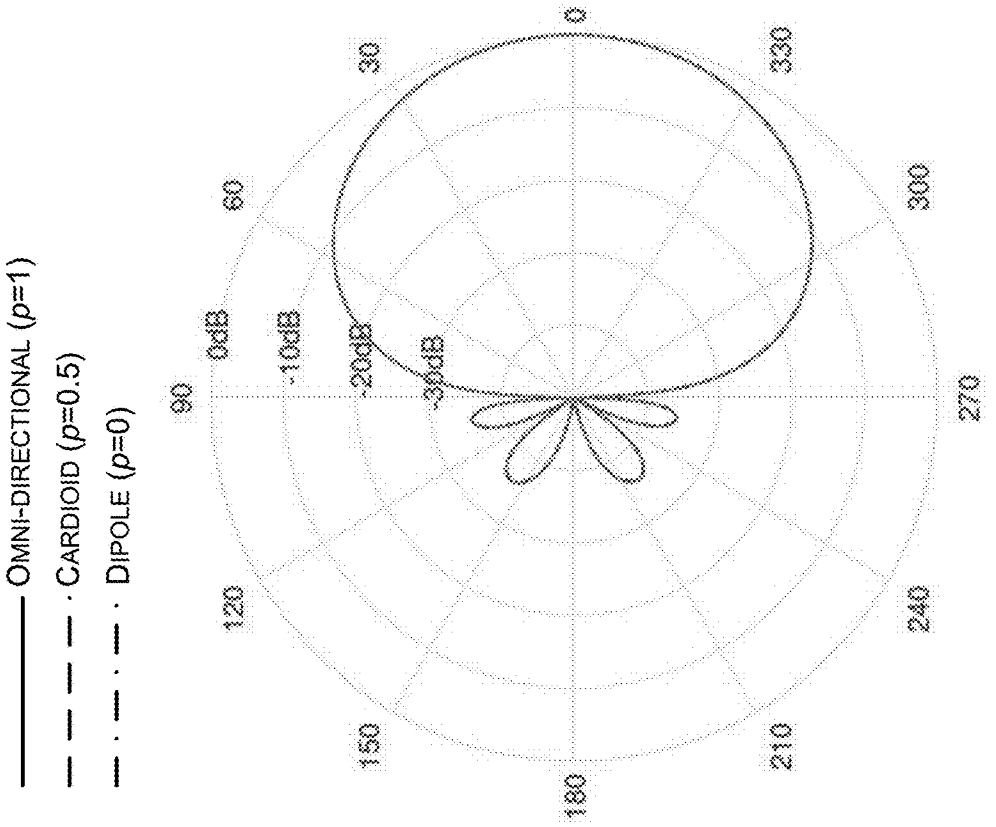
Figure 4A:
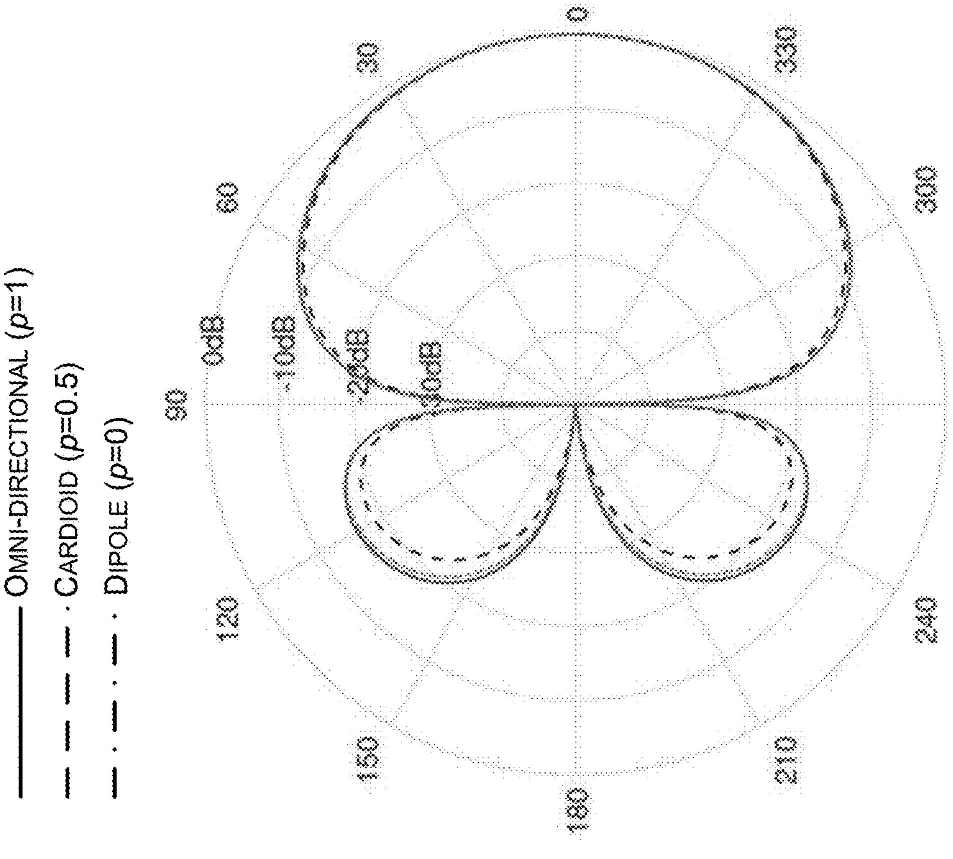
FIGS. 4A and 4B illustrate beampatterns for the second order cardioid and the third order pattern, respectively, at 3 kHz.
Figure 4B:
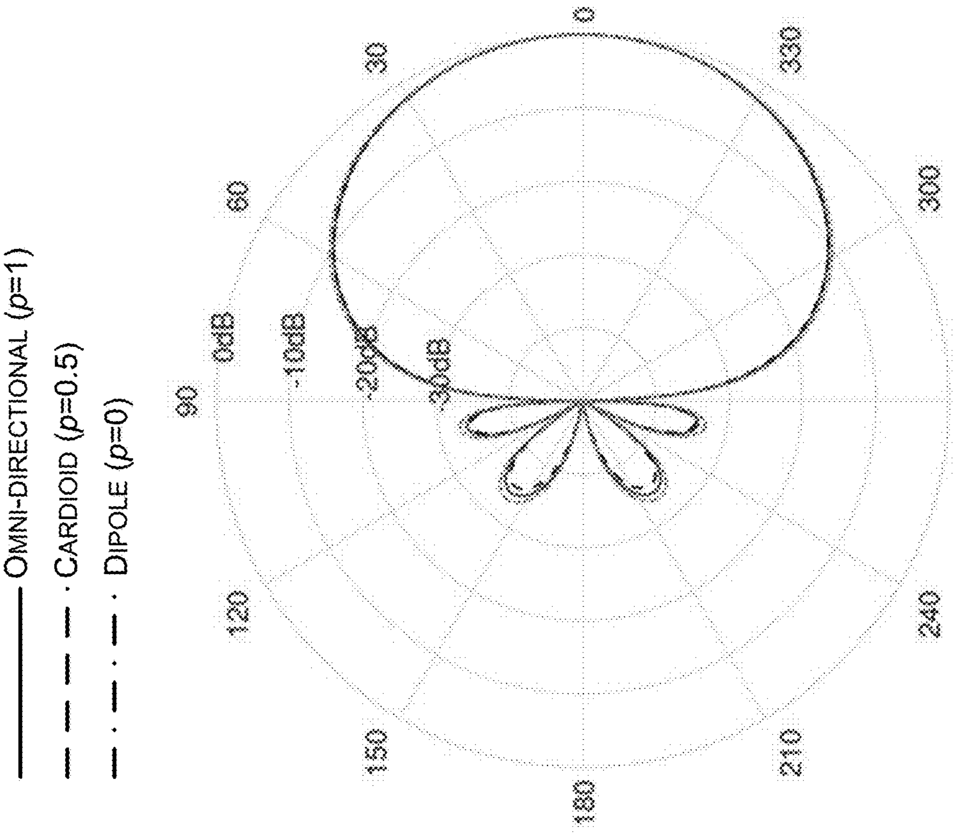
Figure 5A:
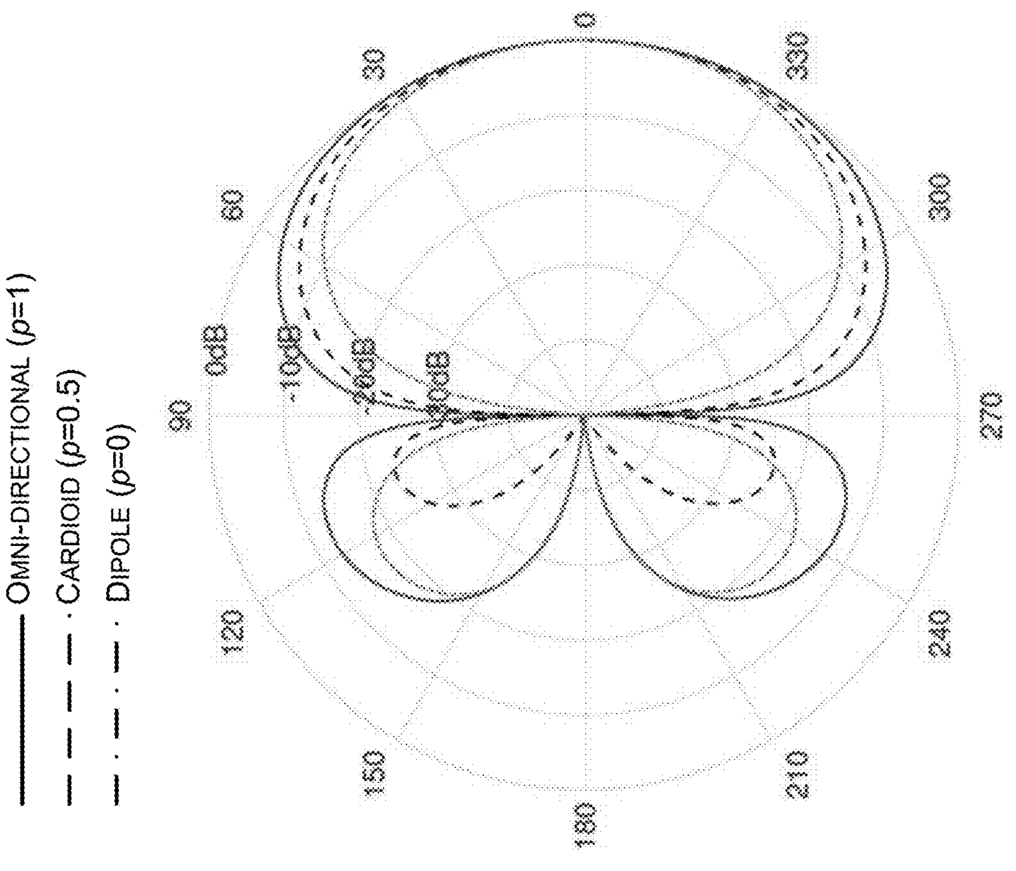
FIGS. 5A and 5B illustrate beampatterns for the second order cardioid and the third order pattern, respectively, at 6 kHz.
Figure 5B:
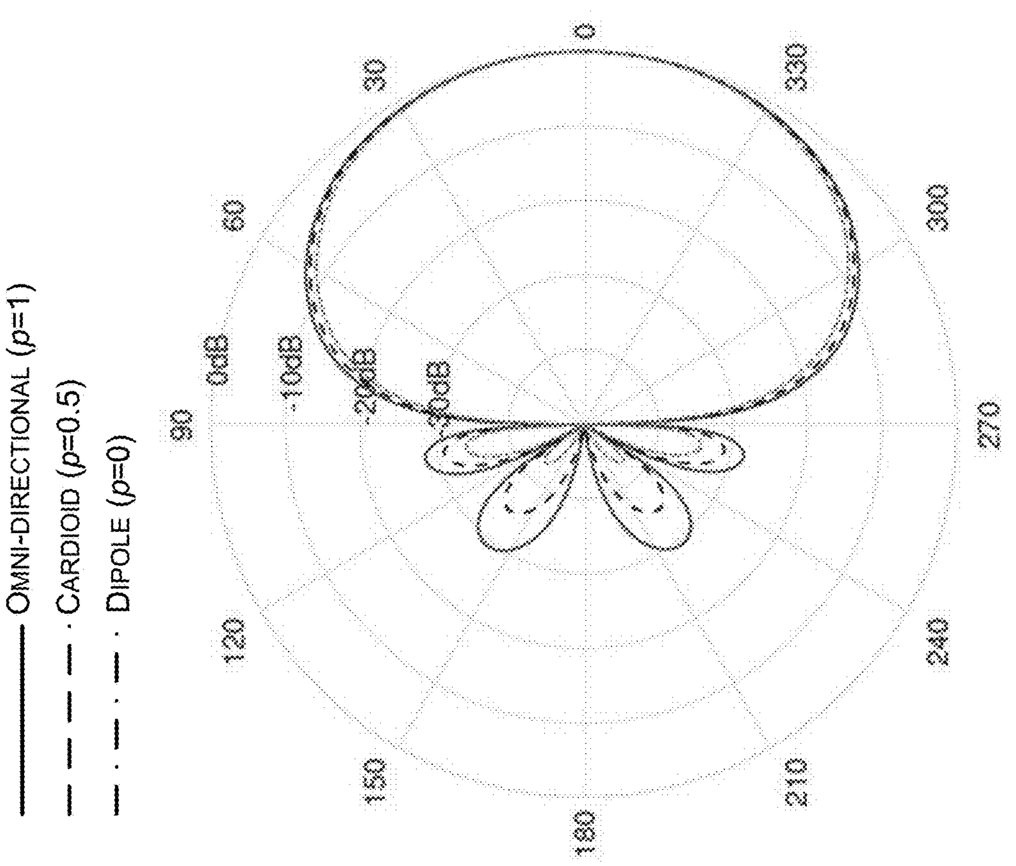

FIGS. 3A and 3B illustrate beampatterns for the second-order cardioid 302 and the third-order pattern 304, respectively, at 1 kHz, and FIGS. 4A and 4B illustrate beampatterns for the second-order cardioid 402 and the third-order pattern 404, respectively, at 3 kHz. As can be observed, the LDDMA beamformers at the low frequencies, 1 kHz and 3 kHz, match the desired beampattern well. However, as shown in FIGS. 5A and 5B, which illustrate beampatterns for the second-order cardioid 502 and the third-order pattern 504, respectively, at 6 kHz, the beampatterns deviate from the desired beampattern at the higher frequency, i.e., 6 kHz. The LDDMA with cardioid elements (p=0.5) obtain the most sidelobe attenuation for 2nd-order design, whereas the LDDMA with dipole microphones (p=0) has the most sidelobe attenuation for 3rd-order design. It is noted that the LDDMA with p=1 becomes the conventional LDMA with the omni-directional microphones.

Figure 6A:
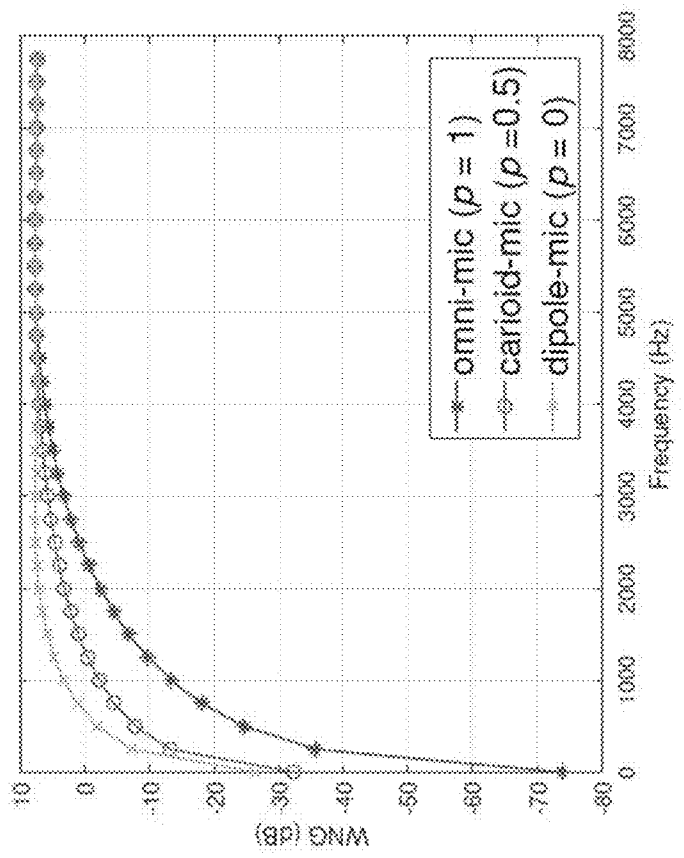
FIGS. 6A and 6B illustrate the comparison in the white noise gain (WNG) and the directivity index (DI), respectively, for the 2nd-order LDDMA design with different types of microphones (p=1, p=0.5, p=0).
Figure 6B:
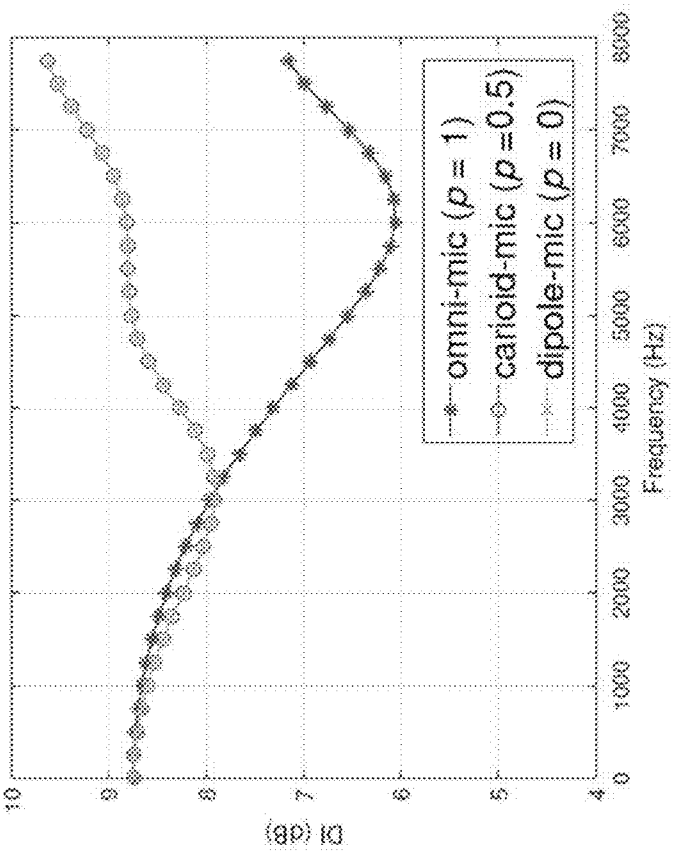
Figure 7B:
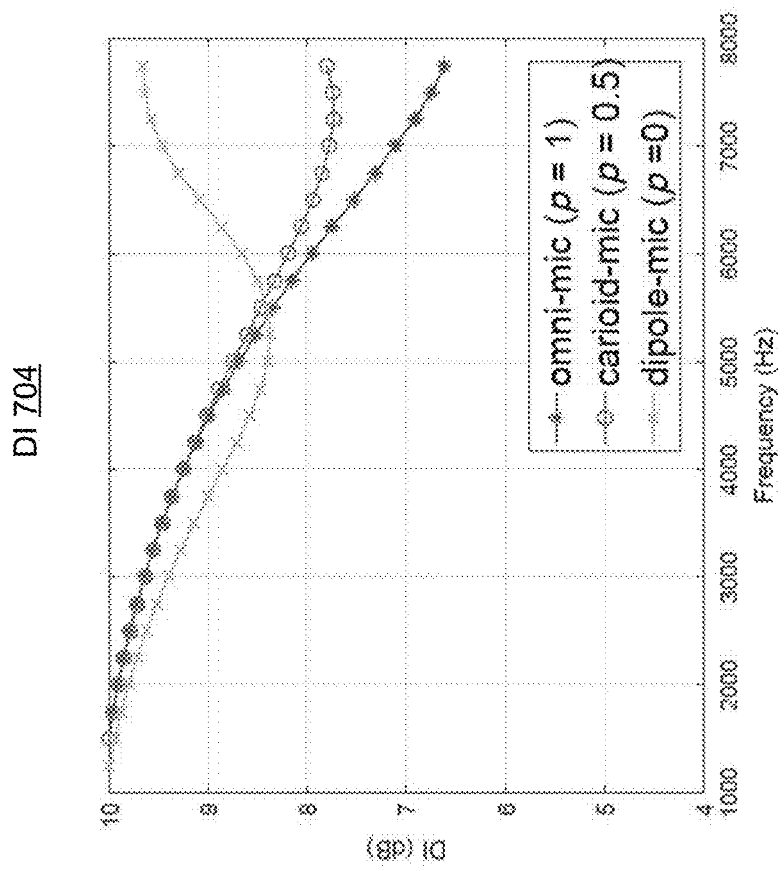
FIGS. 7A and 7B illustrate the comparison in the WNG and the DI, respectively, for the 3rd-order LDDMA design with different types of microphones (p=1, p=0.5, p=0).
Figure 7A:
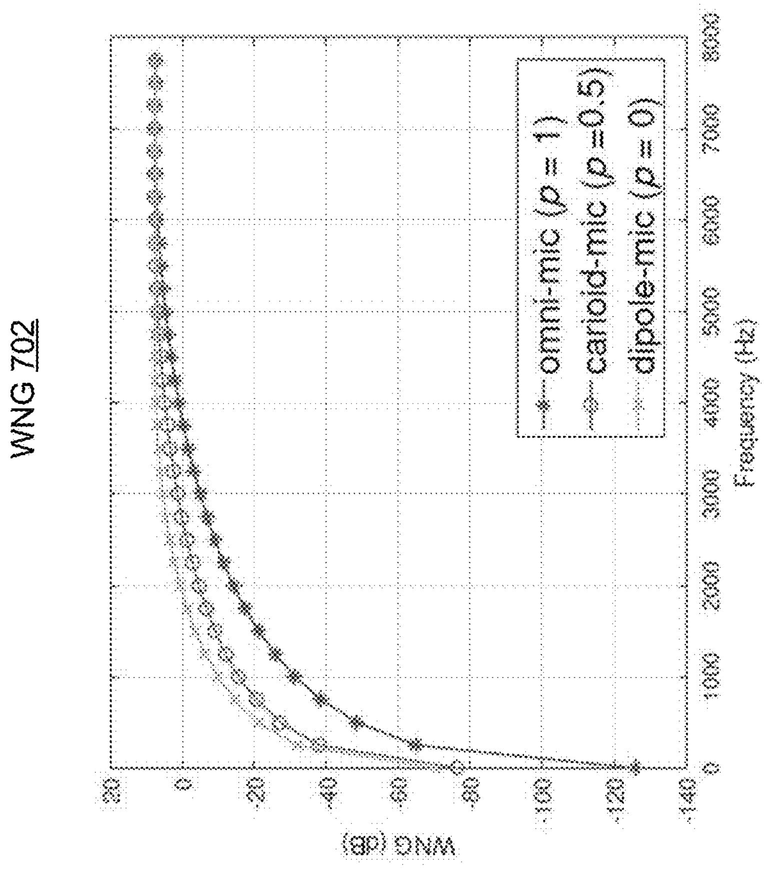

FIGS. 6A and 6B illustrate the comparison in the WNG 602 and the DI 604, respectively, for the 2nd-order LDDMA design with different types of microphones (p=1, p=0.5, p=0) and FIGS. 7A and 7B illustrate the comparison in the WNG 702 and the DI 704, respectively, for the 3rd-order LDDMA design with different types of microphones (p=1, p=0.5, p=0).

As shown in FIG. 6A, the 2nd-order LDDMA with directional microphones (p=0.5 and p=0) exhibits a significantly higher WNG over the conventional LDMA (omni-directional microphones, p=1) at low frequencies, about 20 dB at frequencies below 400 Hz. In FIG. 6B, the 2nd-order LDDMA shows an identical DI with directional microphones for (p=0.5 and for p=0), which is higher than the DI of the conventional LDMA at the high frequencies above about 3 kHz.

As shown in FIG. 7A, the third-order LDDMA design with dipole microphones (p=0) obtains the best WNG in the low frequencies while the conventional LDMA (p=1) exhibits the worst. As shown in FIG. 7B, the LDDMA having both directional microphones (p=0.5 for cardioid and p=0 for dipole) yields a better DI than the one having omni-directional microphone (p=1) at high frequencies, above about 5.5 kHz while the types of microphones do not cause much difference, less than about 0.5 dB in the DI at low frequencies, below about 5.5 kHz.

Thus, the WNG and DI for the 3rd-order design perform similar to those for the 2nd-order design, that is, given the same constraints, the directional microphones are better suited in terms of the WNG and DI performance when constructing an LDMA than omni-directional microphones.

Figure 8:
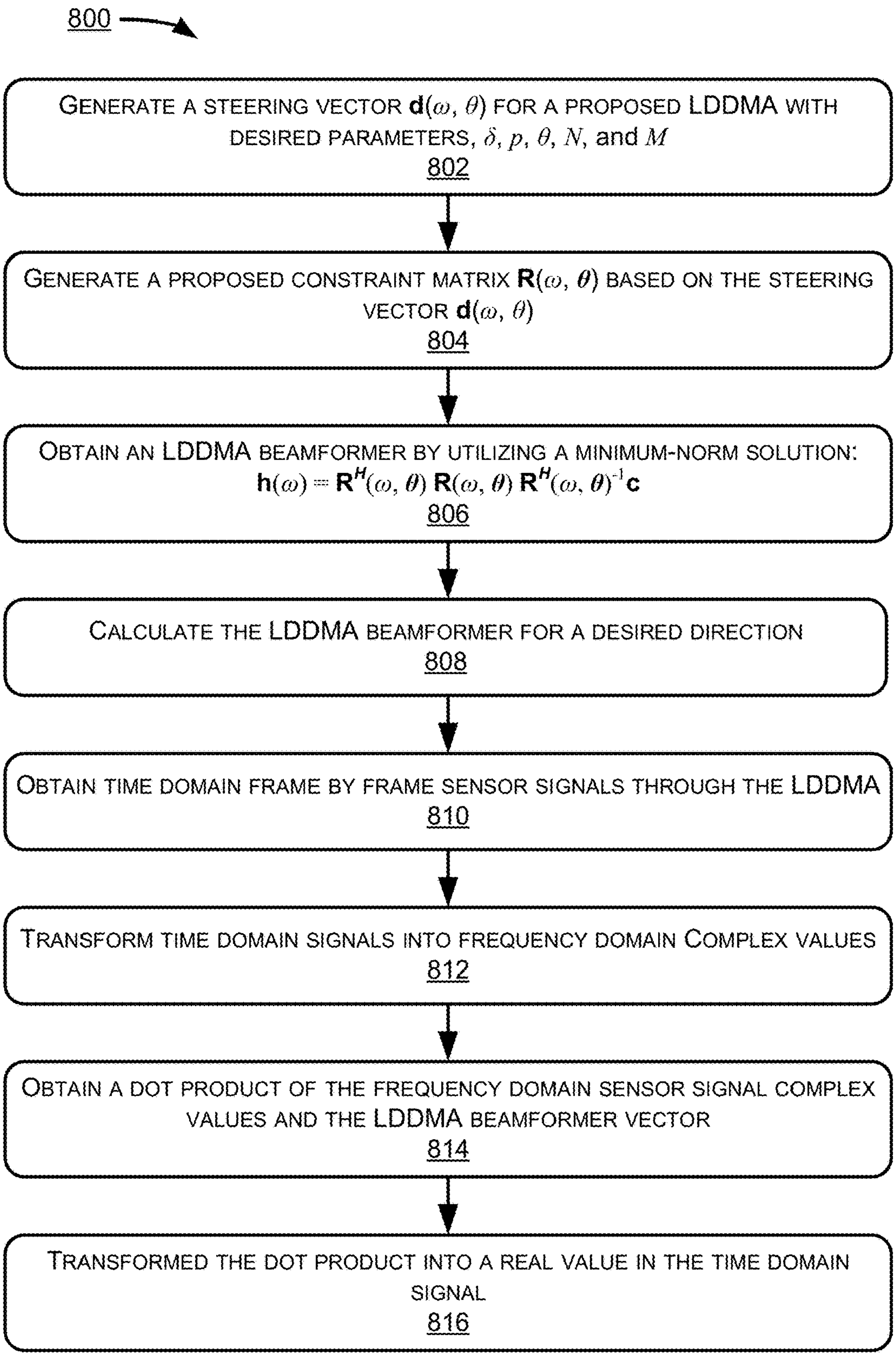
FIG. 8 illustrates an example process for constructing an LDDMA.

FIG. 8 illustrates an example process 800 for constructing an LDDMA. The LDDMA may include uniform and non-uniform LDDMA.

At block 802, a steering vector d(ω, θ) for a proposed apparatus, an LDDMA, may be generated. That is, some desired parameters of the LDDMA, including parameters δ, p, θ, N, and M, may be preselected for generating the steering vector d(ω, θ). At block 804, a proposed constraint matrix. R(ω, θ) may be generated based on the steering vector d(ω, θ). The constraint matrix R(ω, θ) may be reformulated, such as shown in the equation (9), based on a steering matrix and a microphone response matrix, such as the equations (10) and (11), respectively, and be a matrix of a size (N+1)×M, where N is an order of differential beam forming for the ULA and M is a number of microphones. The microphone response matrix may be derived based on a beampattern of a directional microphone with a sound incident angle θ, a steering direction α, and property of the directional microphone p as described above. For example, p=1 indicates omni-directional microphones, p=0.5 indicates cardioid microphones, and p=0 indicates dipole microphones. Although omni-directional, cardioid, are dipole microphones are described, the directional microphones may be any type of directional microphones.

Based on a minimum-norm solution, such as the equation (12) for maximizing the white noise gain (WNG), an LDDMA beamformer, such as h(ω) of the equation (13), may be obtained at block 806. As can be seen, the beamformer h(ω) is frequency dependent complex value weights.

At block 808, the LDDMA beamformer for a desired direction at a desired frequency may be calculated and stored in memory, and time domain frame-by-frame sensor signals through the LDDMA may be obtained at block 810. At block 812, all the time domain sensor signals may be transformed into the frequency domain sensor values. For each frame, the real value of signals in time domain will become a complex value in the frequency domain. The transformation method used may be short-time Fourier transform (STFT), filter-banks, wavelet transform, and the like. In the frequency domain, the LDDMA beamformer complex value weights may be loaded in a vector form (LDDMA beamformer vector) and a dot product of the frequency domain sensor signal complex values and the LDDMA beamformer vector may be obtained at block 814. Then the result of the dot product is a single complex value in the frequency domain, which may be transformed into a real value in the time domain signal by a corresponding inverse transform function.

As discussed above, the effects of different types of directional microphones to form a ULA, for example, omni-directional (p=1), cardioid (p=0.5), and dipole (p=0), on the performance of the LDDMA beamformer, may be used with different array configurations having various inter-element spacing δ and number of elements M at different frequencies for different order patterns, to evaluate beampatterns as illustrated in FIGS. 3A, 3B, 4A, 4B, 5A, 5B, 6A, 6B, 7A, and 7B. An actual LDMMA may then be constructed based on the selected beampattern from the beampatterns and associated parameters, δ, p, θ, N, and M.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/ or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIG. 8. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method for constructing a linear array (LA) of microphones comprising: generating a steering vector for the LA having preselected parameters; generating a constraint matrix based on the steering vector; reformulating the constraint matrix based on a microphone response matrix and a steering matrix; obtaining a beamformer by applying a minimum norm solution in terms of the constraint matrix; verifying a desired characteristic of the LA by calculating the beamformer for a desired direction; and constructing the LA based on the preselected parameters and the beamformer.

B. The method as paragraph A recites, wherein the microphones of the LA are directional microphones and the LA is a linear differential directional microphone array (LDDMA).

C. The method as paragraph B recites, wherein the LDDMA is one of a uniform LDDMA or a non-uniform LDDMA.

D. The method as paragraph A recites, wherein the constraint matrix is a matrix of a size (N+1)×M, where Nis an order of differential beam forming for the LA and M is a number of microphones.

E. The method as paragraph A recites, wherein the microphone response matrix is derived based on a beampattern of a directional microphone with a sound incident angle, a steering direction, and property of the directional microphone.

F. The method as paragraph E recites, wherein the property of the directional microphone includes omni-directional, cardioid, and dipole.

G. The method as paragraph A recites. The method of claim 1, wherein obtaining the beamformer by applying the minimum norm solution in terms of the constraint matrix includes maximizing a white noise gain (WNG).

H. The method as paragraph A recites, wherein calculating the beamformer for the desired direction includes calculating the beamformer for the desired direction for at a desired frequency.

I. The method as paragraph H recites, wherein calculating the beamformer for the desired direction is based on time domain frame-by-frame sensor signals received through the LA.

J. The method as paragraph I recites, further comprising: transforming all of the time domain frame-by-frame sensor signals into frequency domain sensor values.

K. The method as paragraph J recites, further comprising: calculating a dot product of the frequency domain sensor values and a beamformer vector associated with complex value weights of the beamformer.

L. The method as paragraph K recites, wherein constructing the LA based on the preselected parameters and the beamformer includes constructing the LA based on the dot product.

M. A linear array (LA) comprising: a desired number of microphones linearly disposed and spaced with desired inter-microphone distances, the desired number of microphones and the desired inter-microphone distances verified by: generating a steering vector for the LA having preselected parameters; generating a constraint matrix based on the steering vector; reformulating the constraint matrix based on a microphone response matrix and a steering matrix; obtaining a beamformer by applying a minimum norm solution in terms of the constraint matrix; verifying a desired characteristic of the LA by calculating the beamformer for a desired direction; and constructing the LA based on the preselected parameters and the beamformer.

N. The LA as paragraph M recites, wherein the microphones of the LA are directional microphones and the LA is a linear differential directional microphone array (LDDMA).

O. The LA as paragraph N recites, wherein the LDDMA is one of a uniform LDDMA or a non-uniform LDDMA.

P. The LA as paragraph M recites, wherein the constraint matrix is a matrix of a size (N+1)×M, where N is an order of differential beam forming for the LA and M is a number of microphones.

Q. The LA as paragraph M recites, wherein the microphone response matrix is derived based on a beampattern of a directional microphone with a sound incident angle, a steering direction, and property of the directional microphone.

R. The LA as paragraph Q recites, wherein the property of the directional microphone includes omni-directional, cardioid, and dipole.

S. The LA as paragraph M recites, wherein obtaining the beamformer by applying the minimum norm solution in terms of the constraint matrix includes maximizing a white noise gain (WNG).

T. The LA as paragraph M recites, wherein calculating the beamformer for the desired direction includes calculating the beamformer for the desired direction for at a desired frequency.

U. The LA as paragraph T recites, wherein calculating the beamformer for the desired direction is based on time domain frame-by-frame sensor signals received through the LA.

V. The LA as paragraph U recites, further comprising: transforming all of the time domain frame-by-frame sensor signals into frequency domain sensor values.

W. The LA as paragraph V recites, further comprising: calculating a dot product of the frequency domain sensor values and a beamformer vector associated with complex value weights of the beamformer.

X. The LA as paragraph W recites, wherein constructing the LA based on the preselected parameters and the beamformer includes constructing the LA based on the dot product.

Y. A computer-readable storage medium storing computer-readable instructions executable by one or more processors, that when executed by the one or more processors, cause the one or more processors to perform operations comprising: generating a steering vector for the LA having preselected parameters; generating a constraint matrix based on the steering vector; reformulating the constraint matrix based on a microphone response matrix and a steering matrix; obtaining a beamformer by applying a minimum norm solution in terms of the constraint matrix; verifying a desired characteristic of the LA by calculating the beamformer for a desired direction; and constructing the LA based on the preselected parameters and the beamformer.

Z. The computer-readable storage medium as paragraph Y recites, wherein the microphones of the LA are directional microphones and the LA is a linear differential directional microphone array (LDDMA).

AA. The computer-readable storage medium as paragraph Z recites, wherein the LDDMA is one of a uniform LDDMA or a non-uniform LDDMA.

AB. The computer-readable storage medium as paragraph Y recites, wherein the constraint matrix is a matrix of a size (N+1)×M, where N is an order of differential beam forming for the LA and M is a number of microphones.

AC. The computer-readable storage medium as paragraph Y recites, wherein the microphone response matrix is derived based on a beampattern of a directional microphone with a sound incident angle, a steering direction, and property of the directional microphone.

AD. The computer-readable storage medium as paragraph AC recites, wherein the property of the directional microphone includes omni-directional, cardioid, and dipole.

AE. The computer-readable storage medium as paragraph Y recites, wherein obtaining the beamformer by applying the minimum norm solution in terms of the constraint matrix includes maximizing a white noise gain (WNG).

AF. The computer-readable storage medium as paragraph Y recites, wherein calculating the beamformer for the desired direction includes calculating the beamformer for the desired direction for at a desired frequency.

AG. The computer-readable storage medium as paragraph AF recites, wherein calculating the beamformer for the desired direction is based on time domain frame-by-frame sensor signals received through the LA.

AH. The computer-readable storage medium as paragraph AG recites, further comprising: transforming all of the time domain frame-by-frame sensor signals into frequency domain sensor values.

AI. The computer-readable storage medium as paragraph AH recites, further comprising: calculating a dot product of the frequency domain sensor values and a beamformer vector associated with complex value weights of the beamformer.

AJ. The computer-readable storage medium as paragraph AI recites, wherein constructing the LA based on the preselected parameters and the beamformer includes constructing the LA based on the dot product.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for constructing a linear array (LA) of microphones comprising:
- generating a steering vector for the LA having preselected parameters;
- generating a constraint matrix based on the steering vector;
- reformulating the constraint matrix based on a microphone response matrix and a steering matrix;
- obtaining a beamformer by applying a minimum norm solution in terms of the constraint matrix;
- verifying a desired characteristic of the LA by calculating the beamformer for a desired direction; and
- constructing the LA based on the preselected parameters and the beamformer.

2. The method of claim 1, wherein the constraint matrix is a matrix of a size (N+1)×M, where N is an order of differential beamforming for the LA and M is a number of microphones.

3. The method of claim 1, wherein the microphone response matrix is derived based on a beampattern of a directional microphone with a sound incident angle, a steering direction, and property of the directional microphone.

4. The method of claim 1, wherein obtaining the beamformer by applying the minimum norm solution in terms of the constraint matrix includes maximizing a white noise gain (WNG).

5. The method of claim 1, wherein calculating the beamformer for the desired direction includes calculating the beamformer for the desired direction for a desired frequency.

6. The method of claim 5, wherein calculating the beamformer for the desired direction is based on time domain frame-by-frame sensor signals received through the LA.

7. The method of claim 6, further comprising:
- transforming all of the time domain frame-by-frame sensor signals into frequency domain sensor values; and
- calculating a dot product of the frequency domain sensor values and a beamformer vector associated with complex value weights of the beamformer.

8. The method of claim 7, wherein constructing the LA based on the preselected parameters and the beamformer includes constructing the LA based on the dot product.

9. A linear array (LA) comprising:

a desired number of microphones linearly disposed and spaced with desired inter-microphone distances, the desired number of microphones and the desired inter-microphone distances verified by:

generating a steering vector for the LA having preselected parameters;

generating a constraint matrix based on the steering vector;

reformulating the constraint matrix based on a microphone response matrix and a steering matrix;

obtaining a beamformer by applying a minimum norm solution in terms of the constraint matrix;

verifying a desired characteristic of the LA by calculating the beamformer for a desired direction; and constructing the LA based on the preselected parameters and the beamformer.

10. The LA of claim 9, wherein the microphones of the LA are directional microphones and the LA is a linear differential directional microphone array (LDDMA).

11. The LA of claim 10, wherein the LDDMA is one of a uniform LDDMA or a non-uniform LDDMA.

12. The LA of claim 9, wherein the constraint matrix is a matrix of a size (N+1)×M, where N is an order of differential beam forming for the LA and M is a number of microphones.

13. The LA of claim 9, wherein the microphone response matrix is derived based on a beampattern of a directional microphone with a sound incident angle, a steering direction, and property of the directional microphone.

14. The LA of claim 9, wherein obtaining the beamformer by applying the minimum norm solution in terms of the constraint matrix includes maximizing a white noise gain (WNG).

15. The LA of claim 9, wherein calculating the beamformer for the desired direction includes calculating the beamformer for the desired direction for a desired frequency.

16. A computer-readable storage medium storing computer- readable instructions executable by one or more processors, that when executed by the one or more processors, cause the one or more processors to perform operations comprising:

generating a steering vector for a linear array (LA) having preselected parameters;

generating a constraint matrix based on the steering vector;

reformulating the constraint matrix based on a microphone response matrix and a steering matrix;

obtaining a beamformer by applying a minimum norm solution in terms of the constraint matrix;

verifying a desired characteristic of the LA by calculating the beamformer for a desired direction; and constructing the LA based on the preselected parameters and the beamformer.

17. The computer-readable storage medium of claim 16, wherein the constraint matrix is a matrix of a size (N+1)×M, where N is an order of differential beam forming for the LA and M is a number of microphones.

18. The computer-readable storage medium of claim 16, wherein the microphone response matrix is derived based on a beampattern of a directional microphone with a sound incident angle, a steering direction, and property of the directional microphone.

19. The computer-readable storage medium of claim 16, wherein obtaining the beamformer by applying the minimum norm solution in terms of the constraint matrix includes maximizing a white noise gain (WNG).

20. The computer-readable storage medium of claim 16, wherein calculating the beamformer for the desired direction includes calculating the beamformer for the desired direction for a desired frequency.

* * * * *